UNITED STATES PATENT OFFICE.

LEWIS E. SAUNDERS, OF NIAGARA FALLS, NEW YORK, ASSIGNOR TO NORTON COMPANY, OF WORCESTER, MASSACHUSETTS, A CORPORATION OF MASSACHUSETTS.

COMPOSITION OF MATTER CONTAINING OXIDS OF ALUMINUM, SILICON, AND TITANIUM AND METHOD OF MAKING SAME.

954,768.  Specification of Letters Patent.  Patented Apr. 12, 1910.

No Drawing.  Application filed January 14, 1909.  Serial No. 472,348.  (Specimens.)

*To all whom it may concern:*

Be it known that I, LEWIS E. SAUNDERS, a citizen of the United States, residing at Niagara Falls, in the county of Niagara and State of New York, have invented certain new and useful Improvements in Composition of Matter Containing Oxids of Aluminum, Silicon, and Titanium and Method of Making Same, of which the following is a specification.

This invention relates to a composition of matter consisting essentially of alumina, silica and titanium oxid, said composition being substantially free from iron.

This composition of matter is available for use as an abrasive, as a refractory material for the production of cast or molded articles, and for other purposes. A product having the desired percentages of silica and titanium oxid and of substantial purity is readily prepared by thoroughly mixing these several oxids and fusing the mass in an electric furnace into a homogeneous product. This fusion is advantageously carried out in a furnace of the type shown in U. S. Patent No. 775,654, granted November 22, 1904, to Aldus C. Higgins.

For example, I have prepared a product containing substantially 92.5 per cent. of alumina, 3 per cent. of silica and 4.5 per cent. of titanium oxid by fusing a mixture containing these oxids in approximately the above proportions. The product thus prepared is an extremely hard and tough mass, but is quite fusible as compared with pure alumina and is therefore more easily cast. It is brown or red-brown in color and fracture, and possesses a very marked massive or adamantine character and excellent abrasive qualities. A product containing 88 per cent. of alumina, 6 per cent. of silica and 6 per cent. of titanium oxid is essentially similar to the above, but is more readily fusible, and when cooled is even more massive in character. Higher proportions of either silica or titanium oxid than those above mentioned may be advantageously employed for certain purposes.

The product may be prepared by other methods than that mentioned, as for example by the fusion of a bauxite or alum ore containing in addition to alumina, oxids of silicon and titanium, after subjecting the same to such preliminary treatment as may be required for the removal of iron if such be present.

The effect of relatively small proportions of iron oxid is very marked, and it is essential therefore, for the purposes of this invention, that the removal of the iron should be substantially complete. The present invention does not contemplate the presence in the mass of substantial proportions of iron oxid, by which is meant a proportion exceeding about one per cent. by weight of the mass.

In case the raw material contains a greater proportion of silica than is desired the method may be modified by incorporating with the charge a limited proportion of a suitable reducing agent, as aluminum or carbon, such proportion being sufficient to reduce a part only of the silica. By melting a charge of this character in the electric furnace it is found that the titanium oxid remains substantially unreduced and enters into the product as an essential constituent thereof. Or a similar method may be applied to the treatment of silicates of aluminum containing titanium oxid, a sufficient proportion of the reducing agent being added to reduce the silica to the desired extent without substantial reduction of titanium oxid. Such methods are applicable also to the treatment of silicious aluminous materials which contain both titanium oxid and iron oxid, for in this case the iron may be eliminated by reduction together with a portion of the silica, leaving a product consisting essentially of the oxids of aluminum, silicon and titanium. The resulting mass may be crushed and the silicon or silicon alloy separated from the product by well known methods.

I claim:

1. The herein described homogeneous, previously molten material, consisting essentially of the oxids of aluminum, silicon and titanium, and substantially free from iron oxid, said material characterized by hardness and toughness, and by its marked massive or adamantine character.

2. The method of producing a homogeneous, fused material consisting essentially of oxids of aluminum, silicon and titanium and substantially free from iron oxid, which consists in fusing in an electric furnace a material consisting essentially of the said oxids.

3. The method of producing a homogeneous, fused material consisting essentially of oxids of aluminum, silicon and titanium and substantially free from iron oxid, which consists in incorporating with a charge containing oxids of aluminum, silicon and titanium, a reducing agent in proportion to eliminate a part only of the silica, and fusing the resulting mass in an electric furnace.

4. The method of producing a homogeneous, fused material consisting essentially of oxids of aluminum, silicon and titanium and substantially free from iron oxid which consists in incorporating with a charge containing oxids of aluminum, silicon, titanium and iron, a reducing agent in proportion to eliminate substantially all of the iron together with a part only of the silica, and fusing the resulting mass in an electric furnace.

In testimony whereof, I affix my signature in presence of two witnesses.

LEWIS E. SAUNDERS.

Witnesses:
S. F. HALL,
NEIL A. WILSON.